June 2, 1970
E. S. GWATHMEY ET AL
3,514,997
AIRSTREAM DIRECTION DETECTOR
Filed Dec. 23, 1968
2 Sheets-Sheet 1
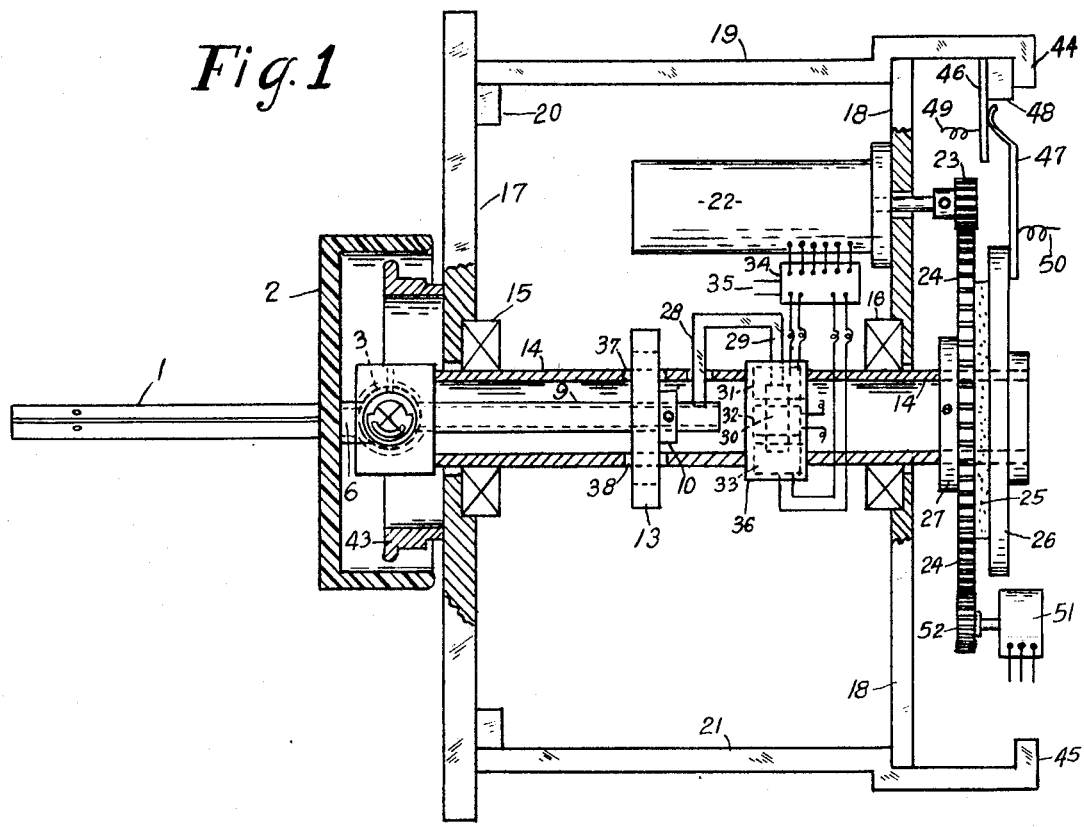
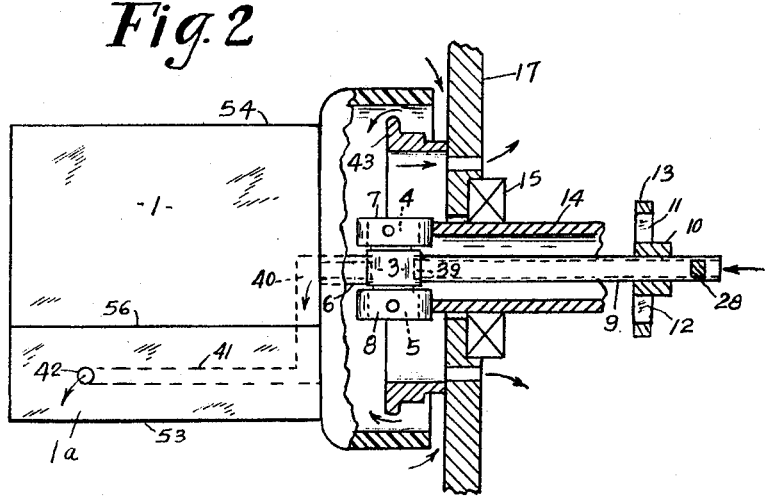
INVENTORS

3,514,997
AIRSTREAM DIRECTION DETECTOR

Edward S. Gwathmey, James N. Davidson, and John M. Ziegler, Charlottesville, Va., assignors to Teledyne, Inc., Hawthorne, Calif., a corporation of Delaware
Filed Dec. 23, 1968, Ser. No. 785,957
Int. Cl. G01c 21/00
U.S. Cl. 73—180                           3 Claims

ABSTRACT OF THE DISCLOSURE

This instrument comprises a novel double tapered wedge type probe attached to a cup which is spaced from and rotatable around a short flanged tube fixed to the casing of the instrument. The probe is mounted so that it can have a limited pivotal movement with respect to the axis of the instrument. This pivotal movement, due to air flow, causes movement of a tube or arm on which a magnetic core element is mounted. Movement of this core with respect to two aligned windings produces electrical signals which cause energization of a servo-motor which rotates mechanism carrying the probe and cup until the probe is aligned with the airstream and then has no pivotal displacement.

---

It is an object to provide an angle of attack instrument or system which can be used both for indicating angle of attack and for controlling other means in accordance with angle of attack.

Another object is to provide an angle of attack sensing device which is suitably ventilated and for removal of water from the device, or prevention of accumulation of water.

A further object is the provision of a special airfoil type angle of attack instrument, the probe being delicately pivoted to control a servo motor as a result of a very small angular movement of the probe about its pivot.

An additional object is to provide an angle of attack instrument of exceptional sensitivity, accuracy, and reliability.

Other objects will be evident in the following description.

In the drawings:

FIG. 1 is a part sectional elevation of our angle of attack indicating or controlling device, showing an edge view of the probe.

FIG. 2 is a part sectional plan view of the probe and a portion of the device shown in FIG. 1. In this case the probe cup is shown with a rounded edge instead of sharp edge as in FIG. 1.

FIG. 3 is a sectional view of the probe, the section being made by a plane passing through the crosswise ventilating channel in the probe and aligned at right angles to a lengthwise axis thereof. A heating element is incorporated within the probe for deicing purposes, but is not shown in FIG. 3.

Figure 4:
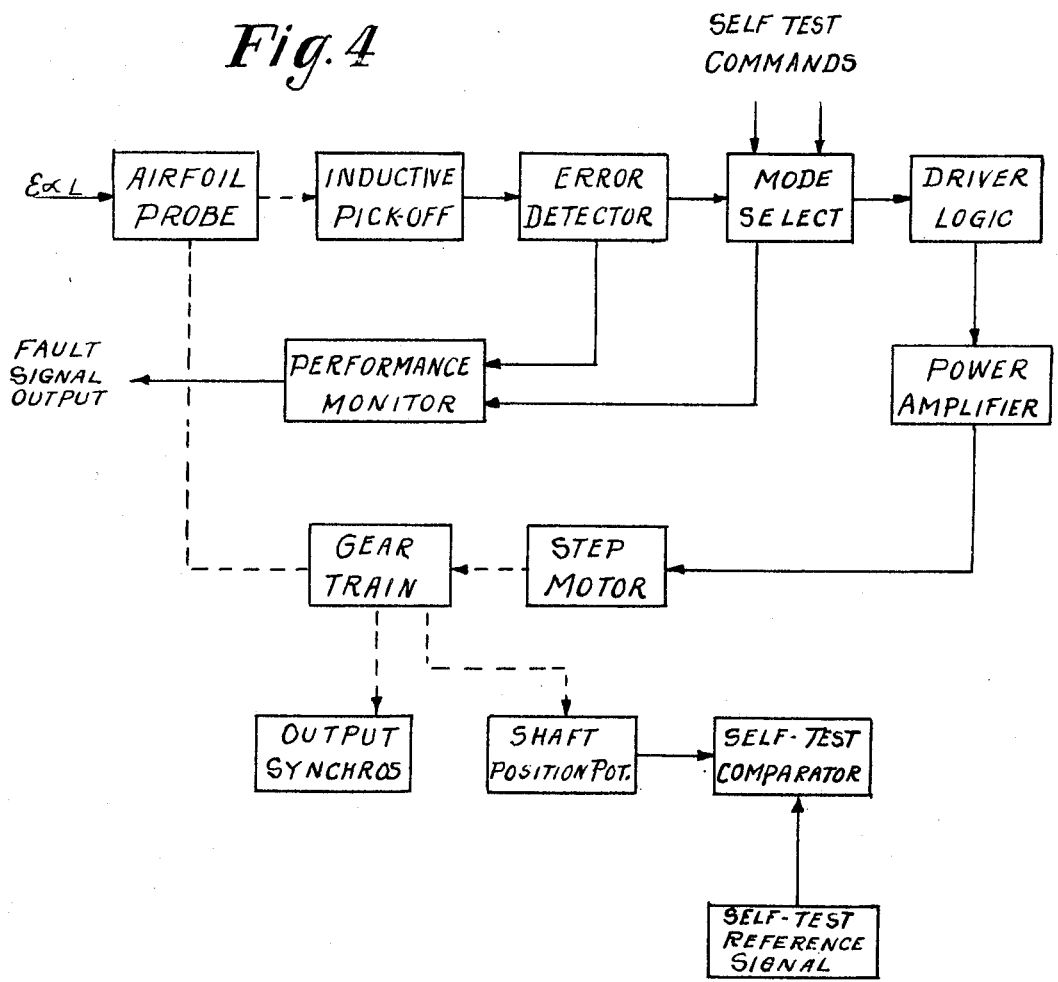
FIG. 4 is a block diagram indicating the system circuitry as actually used in our angle of attack system. The titles make this system self-explanatory.

In FIG. 1, probe 1, seen edgewise, is attached to or integral with cup 2. The probe and cup are preferably made of hard anodized aluminum but may be made of suitable plastics or other material. Cup 2 is attached to central ring 3 of Bendix flexible pivot 4, 3, 5 (FIG. 2), by means of element 6 which is channel to allow flow of air therethrough. This central ring is pivotably movable through a limited angle with relation to coaxial rings 4 and 5 which are clamped in bored blocks 7 and 8 by means of set screws. Tube 9 is also fastened to central pivot ring 3 and carries ring counter-weight 13 with hub 10 which has arms 11 and 12 which are attached to ring 13 also serving as a stop for movement of tube 9 and probe 1 in either of two opposed directions. The stopping action occurs when ring 13 strikes tube or pipe 14 which is rotatable in bearings 15 and 16 nested in recesses in respective frame plates 17 and 18. These plates may be circular or of any suitable shape. Slot 37 in tube 14 may be elongated and ring 13 may be adjustable along the length of tube 9.

Bar 19 is fastened to boss 20 on plate 17 and plate 18 is fastened to bar 19 as indicated, by screws or otherwise. Bar 21 is similarly fastened and there may be three or more bars suitably spaced and fastened to provide a rigid structure. Blocks 4 and 5 are attached to the end of tube 14 which can be rotated in either direction by step motor 22 attached to plate 18. Pinion 23 is attached to the motor shaft and is meshed with larger gear 24 which may be fastened to tube 14 coaxially therewith but which rotates this tube through a clutch including friction pad 25 and flanged disc 26 which is attached to tube 14 by means of a key or set screw. In this case collar 27 is fastened to the shaft and gear 24 floats on the shaft. Spring means may be included in the clutch to force the right face of gear 24 against pad 25. The clutch is not essential, however.

Arm 28, bent as indicated, has portion 29 to which iron, steel, or other magnetizable core member 30 is attached. This core member is movable through a limited displacement inside coaxial windings 31, 32, and 33 of the differential transformer. Leads from windings 31 and 33 are connected with current distribution and amplifier box 34 which has current input leads 35. This box contains electronic components for amplifying currents from transformer windings 31 and 33 and for distributing the amplifier currents in desired order to windings of step motor 22. Such displacement sensing and current distribution circuits and arrangements are well known to those skilled in the art and various types may be used. Leads from transformer primary winding 32 are connected with a suitable source of alternating current, preferably of a frequency of 400 cycles per second.

Windings 31, 32, and 33 are held in tube 36 which is fastened in opposed openings in the wall of tube 14 the axis of which is approximately perpendicular to the axis of tube 36. The arms 11 and 12 are movable in apertures 37 and 38 in tube 14. As stated, these openings may be elongated to allow lengthwise adjustment of the counterweight 10–13.

Channel 39 around flexural pivot member 3 is connected with channeled member 6 which leads into channel 40 in probe 1. Channel 40 is connected with channel 41 in the trailing portion of the probe. This channel is connected with bore 42 extending through the trailing portion 1a of probe 1. The flexural pivot permits limited rotation or pivotal movement of probe 1 about the axis of pivot 4, 3, 5, with negligible friction, causing corresponding swing or rotation of tube 9 and arm 29 about the axis of that pivot. This action results in movement of core 30 relative to differential transformer windings 31, 32, and 33 so that signals are sent to amplifier-distribution assembly 34 and to motor 22 resulting in response of the motor in accordance with the direction of slight rotation of probe 1 about the pivot axis.

Ring 43, stepped as indicated, is attached to plate 17 coaxially with tube 14. This ring is for the purpose of protecting the device from intrusion of water which, by this construction, can drain off. Circulation of the air currents, due to the Venturi effect of opening 42 and connected channels and tubes, is indicated by arrows shown in FIG. 2. These air currents will remove water vapor from the instrument.

Referring to FIG. 1, projections 44 and 45 from respective bars 19 and 21 may be used for fastening a casing member, or a dial or other component. Element 46 may be of arcuate shape and may be wound with resistance wire or it may be a resistance element of any kind. Resilient conductive arm 47 is attached to disc 26 and is in electrical contact with element 46 which is attached to block 48 fastened to bar portion 44. Arm 47 may be electrically insulated from disc 26 and element 46 may be insulated from bar 19. Conductor 49 is connected to a terminal of resistor element 46 and flexible conductor 50 is connected to arm 47. The circuit including conductors 49 and 50 can be used in any desired way to indicate angular rotation of probe 1 and tube 14, the step motor furnishing the power for rotary movement of arm 47. Likewise, this arm may be a pointer and element 46 may be a scale indicating angle of attack or other output. Additionally, one or more servo transmitters 51 may be geared to large gear 24 by pinion 52. This transmitter may be connected to a receiver which will respond to angular movements of gear 24 and tube 14 for any desired purpose. The over-all system circuitry is indicated in FIG. 4.

The novel cross sectional shape of the probe is shown in FIG. 3. The leading edge 54 and the trailing edge 53 are slightly rounded and sharp edges 55 and 56 are provided. We also contemplate the use of a probe in which edges 55 and 56 will be rounded.

Moisture is prevented from entering through the ventilation passages both by pressure gradient and by a non-wetting barrier in the passage, which barrier may be made of Teflon. The heater in the housing provides additional protection by keeping the metal temperature above local dew-point to prevent condensation of moisture from the air. By limiting the annular clearance between the probe hub or cup and the clearance hole in the aircraft skin, the access area for rain is limited. The cavity between the skin and the front face of the instrument serves as a reservoir to trap any rain that enters. The cavity is drained through a hole in the skin at the lowest point of the cavity. Water is prevented from entering the area behind the skirt by a labyrinth passage. Ventilating air enters the housing behind the airfoil or probe skirt through passages in the front flange, circulates through the housing and exits through the hole 42 in the probe. The Venturi effect of relative movement of air past this hole creates a reduced pressure in channel 41 and connected passages, thereby producing the air circulation described, and shown by arrows.

In operation, the instrument is mounted in an opening in the fuselage of an aircraft, the plate 17 either overlapping the peripheral edge of the opening or being flush with the fuselage surface, as desired. Suitable mounting plates or members are provided for attachment to the aircraft. The instrument portion to the right of plate 17 extends into the interior of the fuselage. The various electrical connections to sources of current or to other means are provided. Now assume that the aircraft is flying so that probe 1 is positioned by the slip stream so that the mid-plane of probe 1, including leading edge 54 and trailing edge 53, will be at an angle with the long axis of the aircraft representative of true angle of attack of the aircraft. A very important and apparently novel feature of our device is that probe 1 is pivoted and delicately balanced so that a very slight air pressure on either side of the probe, due to change of angle of attack, will cause the probe to pivot slightly about substantially frictionless flexural pivot 4, 3, 5, with the result that core member 30 is shifted relative to differential transformer windings 31, 32, and 33, causing amplified currents from components in box 34 to energize motor 22 to turn in such a direction that probe 1 and attached cup 2 are rotated until the mid plane of the probe is parallel with the slip stream and core 30 is in central or neutralizing position relative to the surrounding windings which are then electrically balanced and no net control current is supplied to box 24 and to motor 22. Under these conditions the motor is stationary and the position of pointer or arm 47 represents true angle of attack. The position of the rotor of transmitter 51 also corresponds to true angle of attack and the output may be used in any desired manner.

It is apparent, therefore, that our device operates in two steps. First, there is a small pivotal movement of the probe due to unbalanced air pressures on the probe when angle of attack changes, and this small pivotal movement causes an electrical unbalance which results in current being supplied to a step motor or other actuator to rotate the probe in such direction that a balanced condition of air pressure on the probe occurs again. Under this balanced condition the probe position is representative of true angle of attack and the step motor is not effectively energized.

We have tested our invention extensively and we have found that it is quite stable and accurate besides being more sensitive than prior angle of attack instruments. It also has the advantages that it is less liable to be affected by rain and snow and it includes power means for causing movement of potentiometer or variable resistor wipers, servo transmitters, or other desired output means. It should be understood that the principles which we have disclosed may also be used in other instruments or devices in addition to angle of attack instruments.

While we have described edge 54 of the probe as the leading edge we have also used the instrument successfully with edge 53 as the leading edge.

What we claim is:

1. In an instrument for detecting the direction of a fluid stream relative to a body moving relatively thereto, a tapered probe, situated in said fluid, means for rotating said probe about an axis to change the angle of attack of said probe relative to an axis of a vehicle carrying said instrument, pivot means attaching said probe to said rotating means for pivoted movement of said probe relative thereto, means for sensing relatively small pivotal movements of said probe, means including power means for producing rotation of said rotating means in either of two directions, and means operatively connecting said power means and said probe to cause energization of said power means in accordance with pivotal movements of said probe, said operatively connecting means including an elongated arm movable by said probe, and electrical means operatively connected with said arm and said power means to cause actuation thereof to produce rotation of said rotating means and probe in a direction depending upon the direction of pivotal movement of said probe, and including a counter-weight carried by said elongated arm for balancing said probe about the pivot means.

2. In an instrument for detecting the direction of a fluid stream relative to a body moving relatively thereto, a tapered probe situated in said fluid, means for rotating said probe about an axis to change the angle of attack of said probe relative to an axis of a vehicle carrying said instrument, pivot means attaching said probe to said rotating means for pivoted movement of said probe relative thereto, means for sensing relatively small pivotal movements of said probe, means including power means for producing rotation of said rotating means in either of two directions, and means operatively connecting said power means and said probe to cause energization of said power means in accordance with pivotal movements of said probe, and including a cup-like hub attached to said probe, the annular periphery of said hub being spaced from a portion of the casing of said instrument, and a stepped ring coaxial with said hub and attached to said casing portion and projecting into said hub.

3. In an instrument for detecting the direction of a fluid stream relative to a body moving relatively thereto, a tapered probe situated in said fluid, means for rotating said probe about an axis to change the angle of attack of said probe relative to an axis of a vehicle carrying said instrument, pivot means attaching said probe to said rotating means for pivoted movement of said probe relative thereto, means for sensing relatively small pivotal movements of said probe, means including power means for producing rotation of said rotating means in either of two directions, and means operatively connecting said power means and said probe to cause energization of said power means in accordance with pivotal movements of said probe, said probe having two relatively short trailing plane surfaces divergent from the trailing edge of said probe, and two relatively long forward plane surfaces divergent from the leading edge of said probe, the forward and trailing surfaces joining along lines at their widest divergence.

References Cited

UNITED STATES PATENTS

| | | | |
|---|---|---|---|
| 2,699,065 | 1/1955 | Blair | 73—180 |
| 2,850,896 | 9/1958 | Se Legue et al. | 73—188 |
| 3,108,473 | 10/1963 | Serra et al. | 73—180 X |

LOUIS R. PRINCE, Primary Examiner

J. W. ROSKOS, Assistant Examiner

U.S. Cl. X.R.

244—1; 340—27